(No Model.)

W. H. TUCKER.
FURNITURE CASTER.

No. 347,749. Patented Aug. 17, 1886.

WITNESSES.
Gustav Bohn.
D. H. Fatout

INVENTOR.
Wm. H. Tucker.
By C. P. Jacobs
Atty.

UNITED STATES PATENT OFFICE.

WILLIAM H. TUCKER, OF INDIANAPOLIS, INDIANA.

FURNITURE-CASTER.

SPECIFICATION forming part of Letters Patent No. 347,749, dated August 17, 1886.

Application filed June 17, 1886. Serial No. 205,502. (No model.)

*To all whom it may concern:*

Be it known that I, WILLIAM H. TUCKER, a resident of Indianapolis, Marion county, Indiana, have made certain new and useful Improvements in Furniture-Casters, a description of which is set forth in the following specification, reference being made to the accompanying drawings, in the several figures of which like letters represent like parts.

Figure 1:
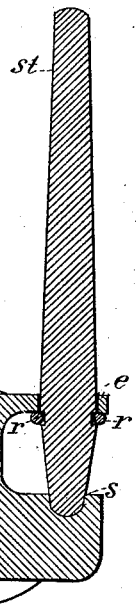
Figure 2:
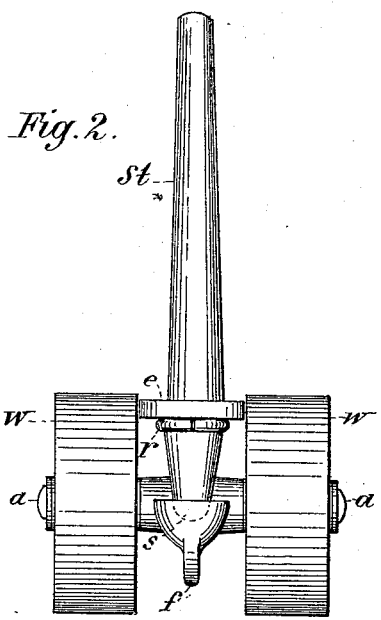

My invention relates to the construction of double-wheeled furniture-casters, providing for a revolution of the wheel-frame about the stem, and the oscillation of the stem to allow for a lateral movement, and will be understood from the following description:

In the drawings, Figure 1 is a vertical section through the center of the stem and the wheel-frame between the wheels. Fig. 2 is a rear view of the device, and Fig. 3 is a top view of the same.

Figure 3:
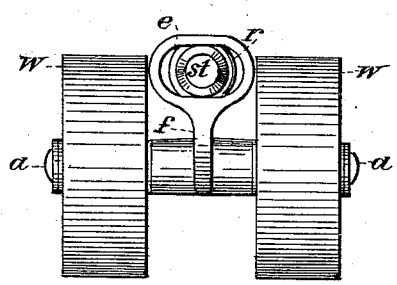

In detail, $st$ is the stem, whose lower and rounded end has bearings in the socket $s$ in the lower and heaviest portion of the frame $f$, and passes through an elliptical opening in the ear $e$, which projects from the top portion of the frame, so that the stem is allowed a lateral movement within the limit of this elliptical opening, as shown in Fig. 3. A wire ring, $r$, is pressed around the stem and into a groove provided in said stem for that purpose below the ear $e$, as shown in Figs. 1 and 2, thus securing the connection of the stem to the frame, and they can only be separated by the removal of this wire ring. Various equivalents for this wire ring will readily suggest themselves—such as an ordinary pin entering a hole in the spindle; but the wire ring is preferable, as being less liable to get out of place in moving about the furniture. The paired floor-wheels $w$ are mounted on the common axle $a$, which passes through and has bearings in the front part of the frame $f$, as shown in Fig. 1. The stem $st$ is adapted to enter a hole in the leg of the furniture; but, if desired, the caster may be connected to the furniture by means of a plate provided with screw-holes instead of the stem. When the caster has been fixed to the furniture, it is obvious that the wheels and frame will revolve about the stem $st$, and when the wheels in passing over the floor meet any obstacle or any inequality of the surface, the oscillation of the stem $st$ in the elliptical opening in the ear $e$ will allow either wheel to rise, and thus the caster will adapt itself to the inequalities of the floor without disturbing its relation to the article of furniture to which it is attached.

I am aware that two-wheeled casters for furniture, allowing this compound motion—viz., the revolution of the caster about the stem in a horizontal plane and the oscillation of the same in a vertical plane—have been heretofore used, and do not broadly claim the same as my invention.

What I do claim, however, and desire to secure by Letters Patent, is the following:

In a furniture-caster, a pair of floor-wheels mounted on a common axle, a frame-work, also carried upon this axle and between the wheels, provided with a socket below for receiving the base of the stem or spindle and with an ear above having an elliptical opening, through which the spindle passes, for limiting the movement of the parts with relation to each other, with a detachable ring for clasping the spindle below the upper opening in the wheel-frame and of larger outside diameter than the opening above it, all combined substantially as described.

In witness whereof I hereunto set my hand, this 8th day of June, 1886.

WILLIAM H. TUCKER.

Witnesses:
  C. P. JACOBS,
  HATTIE MURRY.